US008452769B2

(12) United States Patent
Altaf et al.

(10) Patent No.: US 8,452,769 B2
(45) Date of Patent: May 28, 2013

(54) CONTEXT AWARE SEARCH DOCUMENT

(75) Inventors: Faheem Altaf, Pflugerville, TX (US); Eduardo N. Spring, Round Rock, TX (US); Benjamin S. Vera-Tudela, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 884 days.

(21) Appl. No.: 12/233,741

(22) Filed: Sep. 19, 2008

(65) Prior Publication Data

US 2010/0082570 A1  Apr. 1, 2010

(51) Int. Cl.
*G06F 17/30* (2006.01)
*G06F 7/00* (2006.01)

(52) U.S. Cl.
USPC .......................................... 707/736; 707/722

(58) Field of Classification Search
None
See application file for complete search history.

(56) References Cited

U.S. PATENT DOCUMENTS

| | | | |
|---|---|---|---|
| 6,446,065 B1* | 9/2002 | Nishioka et al. | 1/1 |
| 6,948,135 B1 | 9/2005 | Ruthfield et al. | |
| 2003/0204492 A1* | 10/2003 | Wolf et al. | 707/3 |
| 2004/0216032 A1 | 10/2004 | Amitay et al. | |
| 2005/0033803 A1* | 2/2005 | Vleet et al. | 709/203 |
| 2005/0278293 A1* | 12/2005 | Imaichi et al. | 707/1 |
| 2006/0212621 A1 | 9/2006 | Ash et al. | |
| 2007/0055657 A1* | 3/2007 | Yano | 707/3 |
| 2007/0088695 A1* | 4/2007 | Bleyendaal et al. | 707/5 |
| 2007/0233692 A1* | 10/2007 | Lisa et al. | 707/10 |
| 2008/0005651 A1* | 1/2008 | Grefenstette et al. | 715/500 |
| 2008/0059419 A1* | 3/2008 | Auerbach et al. | 707/3 |
| 2008/0195586 A1* | 8/2008 | Arnold et al. | 707/3 |
| 2009/0193014 A1* | 7/2009 | Menezes et al. | 707/5 |

* cited by examiner

*Primary Examiner* — Tarek Chbouki
(74) *Attorney, Agent, or Firm* — DeLizio Gilliam, PLLC (57) ABSTRACT

While creating a document in a document editing application, a user may wish to locate more information on a particular topic to add more detail to the document. For example, a user begins creating an outline of topics for a research paper. Functionality can be implemented in a document editing application to dynamically perform searches on determined keywords, and to automatically associate search results with those keywords. In addition, searches are refined based on document context, and results can be categorized based on prior consumption of the information contained in each result. This allows a user to locate results best pertaining to topics in the document while being able to retrieve resources that have been useful in the past. Automatically performing searches and associating search results with text in a document gives a user instant access to relevant information which allows the user to spend less time researching.

22 Claims, 6 Drawing Sheets

CONTEXT AWARE SEARCH DOCUMENT

BACKGROUND

Embodiments of the inventive subject matter generally relate to the field of document editing applications, and, more particularly, to dynamic association of search content with keywords in a document.

Document editing applications, such as Microsoft® Word, PowerPoint and Google® Documents, allow users to associate text in a document with links to resources. Linkable resources include web pages, documents existing on the user's computer or on a company server, etc. A user may want to associate a particular phrase in the document with search results for the phrase so the user can return to the search results at a later time to add more detail to the document. To associate the phrase with the search results, the user manually types the phrase into a search engine open in a browser, copies the Uniform Resource Locator (URL) of the search results, launches a create link tool in the document and pastes the URL into the tool's text box.

SUMMARY

Embodiments include a method directed to determining a plurality of keywords based on text in a document, wherein the plurality of keywords comprise word or phrases that appear in the document. Searches are dynamically performed on one or more sources with the plurality of keywords, wherein the dynamically performed searches yield one or more search results. Search results are automatically associated with corresponding ones of the plurality of keywords.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to document editing applications, embodiments can be implemented in web based document editors. In other instances, well-known instruction instances, protocols, structures and techniques have not been shown in detail in order not to obfuscate the description.

While creating a document in a document editing application, a user may wish to locate more information on a particular topic to add more detail to the document. For example, a user begins creating an outline of topics for a research paper. Functionality can be implemented in a document editing application to dynamically perform searches on determined keywords, and to automatically associate search results with those keywords. In addition, searches are refined based on document context, and results can be categorized based on prior consumption of the information contained in each result. This allows a user to locate results best pertaining to topics in the document while being able to retrieve resources that have been useful in the past. Automatically performing searches and associating search results with text in a document gives a user instant access to relevant information which allows the user to spend less time researching.

Figure 1:
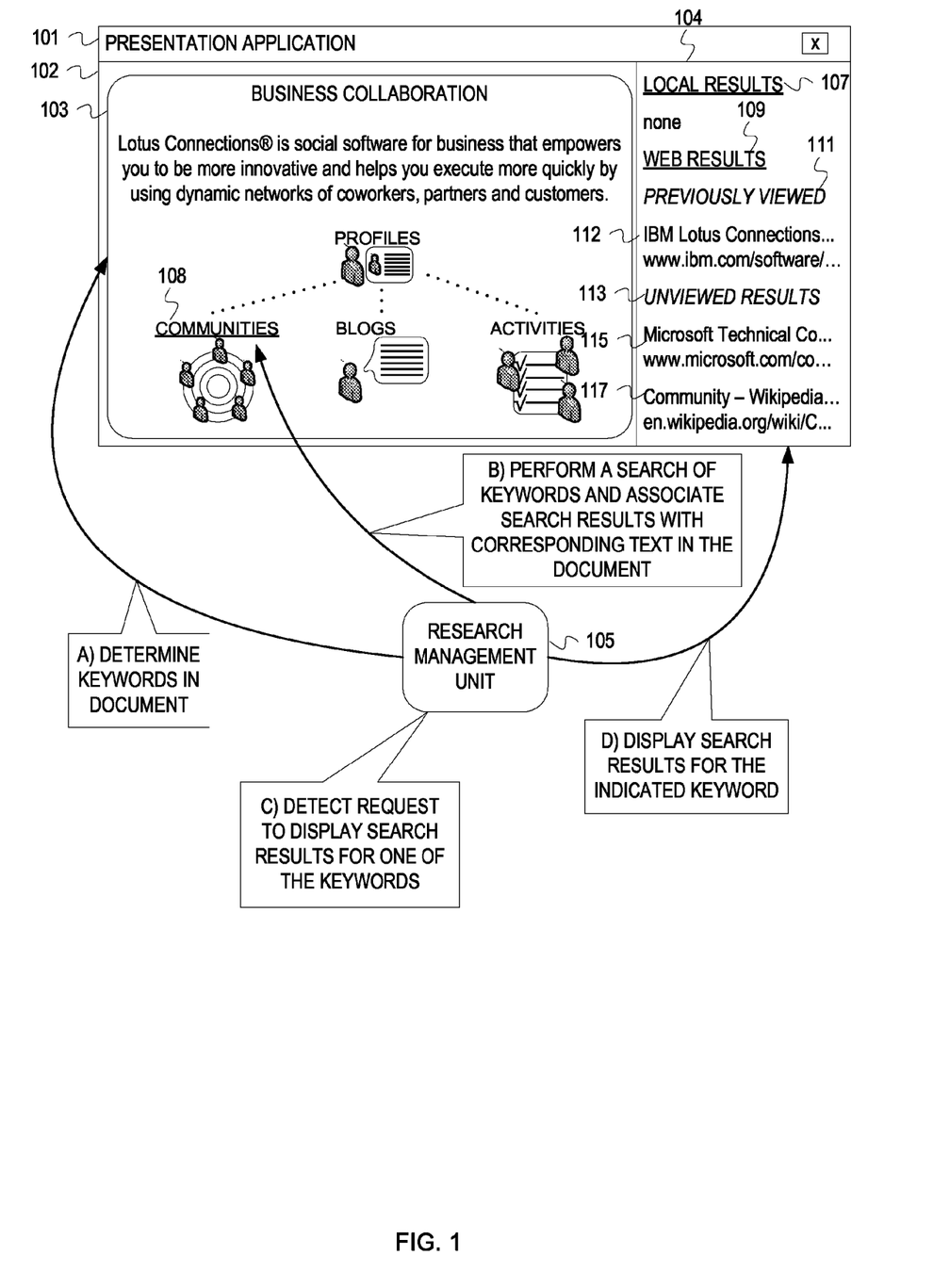
FIG. 1 depicts an example conceptual diagram of automatically performing a search on determined keywords in a document and associating search results with the keywords.

FIG. 1 depicts an example conceptual diagram of automatically performing a search on determined keywords in a document and associating search results with the keywords. A presentation application 101 comprises a document editing area 102 and a research area 104. A document 103 comprising a slide is open for editing in document editing area 102.

At stage A, a research management unit 105 determines keywords in a document 103. In this example, the document 103 is a presentation comprising a slide. Other examples of documents include word processing documents, spreadsheets, web pages, etc. Keywords may be indicated by a user. For example, a user highlights text in a document and selects an option from a drop down menu to use the text as a keyword. As another example, a user types a phrase into a list of keywords for a document. Keywords may also be determined automatically based on preferences. Automatic determination can be based on at least one of determining the number of times a word or phrase appears in text of the document 103, comparing phrases previously used for searches with text in the document 103, etc. Preferences may indicate a threshold for the number of times a word or phrase should appear in a document before being included as a keyword, a maximum number of keywords, etc. Certain words and phrases can be ignored (e.g., and, the, on the other hand, etc.) by default when the research management unit 105 determines keywords. Preferences may indicate other words that should be ignored. When a word or phrase is determined to be a keyword, the research management unit 105 may access a thesaurus to include synonyms found in the document 103 as keywords. In this example, text 108 "communities" is one of the keywords for document 103.

At stage B, the research management unit 105 performs a search with text 108 and associates search results to the corresponding text 108 in the document 103. In this example, one keyword is depicted, but other keywords may exist for document 103. A search is performed for each keyword. The search is performed for related documents on a local machine and one or more Internet search engines. The one or more Internet search engines to be used for the search are indicated in the preferences. In some embodiments, other special purpose search engines may be used. Examples of special purpose search engines include LexisNexis®, Institute of Electrical and Electronics Engineers (IEEE) publication database, a company intranet, etc. Preferences indicate the special purpose search engines to be searched and may store login information needed to access the special purpose search engines. The search results may be associated with the corresponding text 108 in the document 103 by associating one or more hyperlinks to the search results with the text 108. For example, the text 108 is linked to a hyperlink referencing Google search results. As another example, the text is associated to a specific number of hyperlinks referencing Google search results. The text 108 may also be associated with one or more references to cached copies of the search results. For example, a specific number of search results are retrieved and cached. The text is then associated with a list of references to the cached copies of the search results.

At stage C, the research management unit 105, detects a request to display search results for keyword "communities." Examples of detecting a request to display search results include detecting a click on the linked text in the document, detecting a short-key sequence typed on the keyboard, etc.

At stage D, the research management unit 105 displays the search results for the keyword "communities." The search results comprise local results 107, and web results 109. In this example, the local search returned zero results. In some embodiments, the search results may also comprise special purpose search engine results. The local results 107 are documents located on a user's local machine. The web results 109 are categorized into two categories, previously viewed results 111 and unviewed results 113. The web search returned 1 previously viewed result 112 and 2 unviewed results 115 and 117. Preferences may specify policies regarding categorizing a result as a previously viewed result. For example, the result may be categorized as previously viewed if the user spent more than 30 seconds viewing the result. In addition, a resource returned during a search may not be displayed if the user previously marked the resource as unrelated or not useful.

Figure 2:
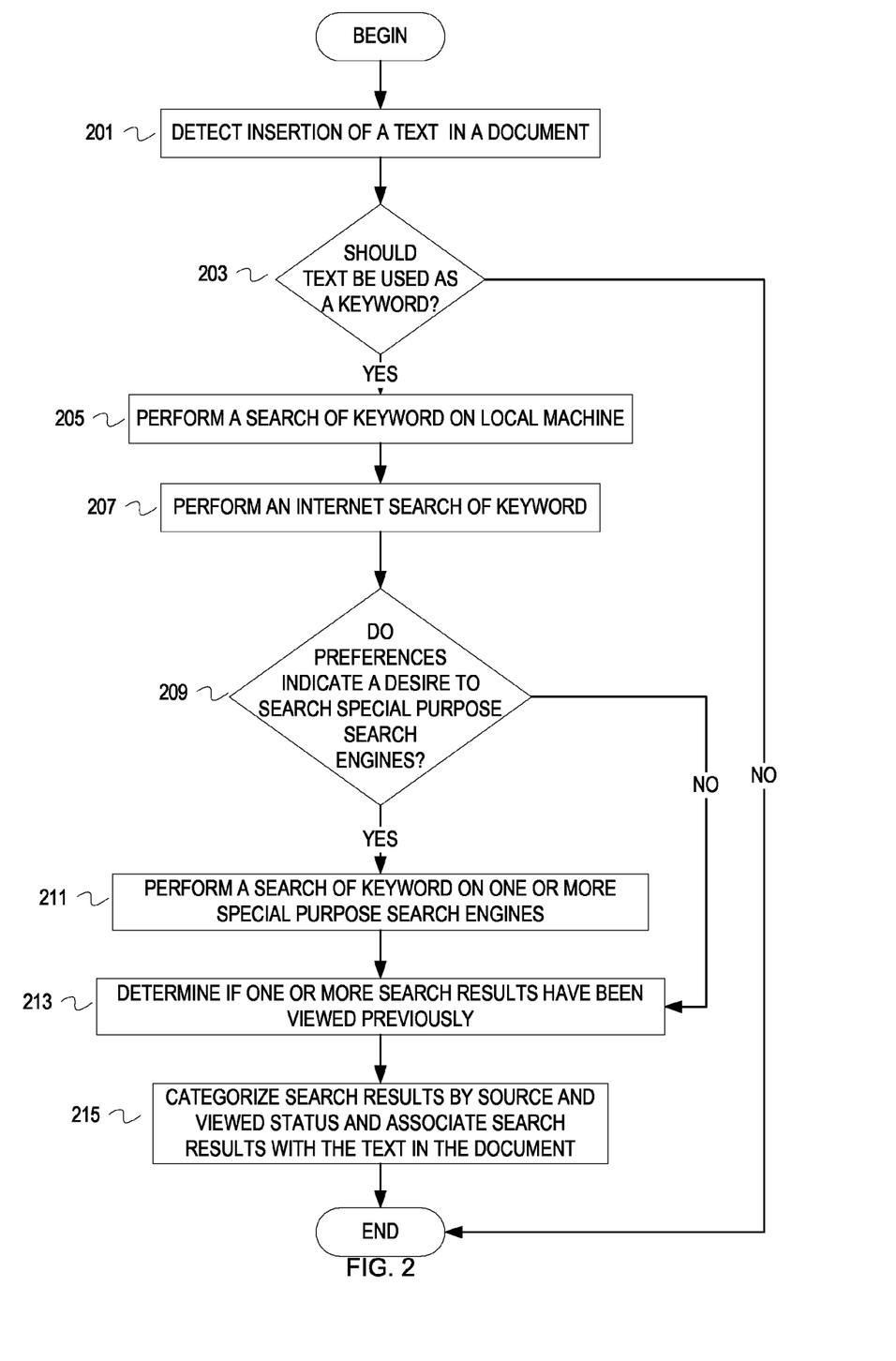
FIG. 2 is a flowchart depicting example operations for automatically performing search results on a keyword in a document and associating the search results to the keyword in the document.

Searches may be performed one-at-a-time as keywords are identified or in batch after a group of keywords are identified. FIG. 2 is a flowchart depicting example operations for automatically performing search results on a keyword in a document and associating the search results to the keyword in the document. Flow begins at block 201, where the insertion of text into a document is detected. Examples of detecting insertion of text include detecting typing in the document, detecting pasting of text into the document, etc.

At block 203, it is determined if the text should be used as a keyword. Techniques for determining if the text should be used as a keyword comprise comparing the text with a list of indicated keywords, determining if the text appears a certain number of times in the document, determining if synonyms of the text appear in the document etc. In some embodiments, the keywords for the document may be updated by a suggestion engine. The suggestion engine scans the keyword list for synonyms or related words and may group one or more keywords together to form a more specific keyword to narrow results returned for a subsequent search. For example, if "dog" and "police" are two keywords in the document, the suggestion engine may combine the two keywords into "police dog." The suggestion engine may also associate keywords with related words or phrases such as synonyms, abbreviations, slang, etc. that do not appear in document text. For example, a keyword for the document may be "doberman." The word "pinscher" may be associated with the keyword because the two words are commonly used together.

At block 205, a search for the keyword is performed on a user's local machine.

At block 207, an Internet search of the keyword is performed. The Internet search may be performed on a single preferred search engine or on more than one search engine. Search results may be refined or ranked by comparing words or phrases in the text of the search results with words or phrases in the document. If a larger number of words or phrases match between a first search result and the document, the search result is ranked higher than a second search results fewer matching words or phrases. In addition, a threshold may be specified for the number of times a keyword should appear in a resource returned by a search before it is included in the search results. If the keyword does not appear more times than the threshold number, the resource may be discarded.

At block 209, it is determined if preferences indicate a desire to search special purpose search engines. If preferences indicate a desire to search special purpose search engine, flow continues at block 211. If preferences do not indicate a desire to search special purpose search engine, flow continues at block 213.

At block 211, a search of the keyword is performed on one or more special purpose search engine. Some special purpose search engines require a subscription or login information. The subscription or login information may be stored in the preferences.

At block 213, it is determined if one or more search results have been previously viewed. A browser plug-in may be utilized to capture a cache of search terms used and the resources viewed within the search results for each search term. The URL of the resource and number of times the resource was viewed may be captured.

At block 215, the search results are categorized by source and associated with the text in the document. Sources include the local machine, one or more search engines, one or more special purpose search engines, etc. Search results may also be categorized based on viewing history, relevancy to other keywords in the document, etc.

Figure 3:
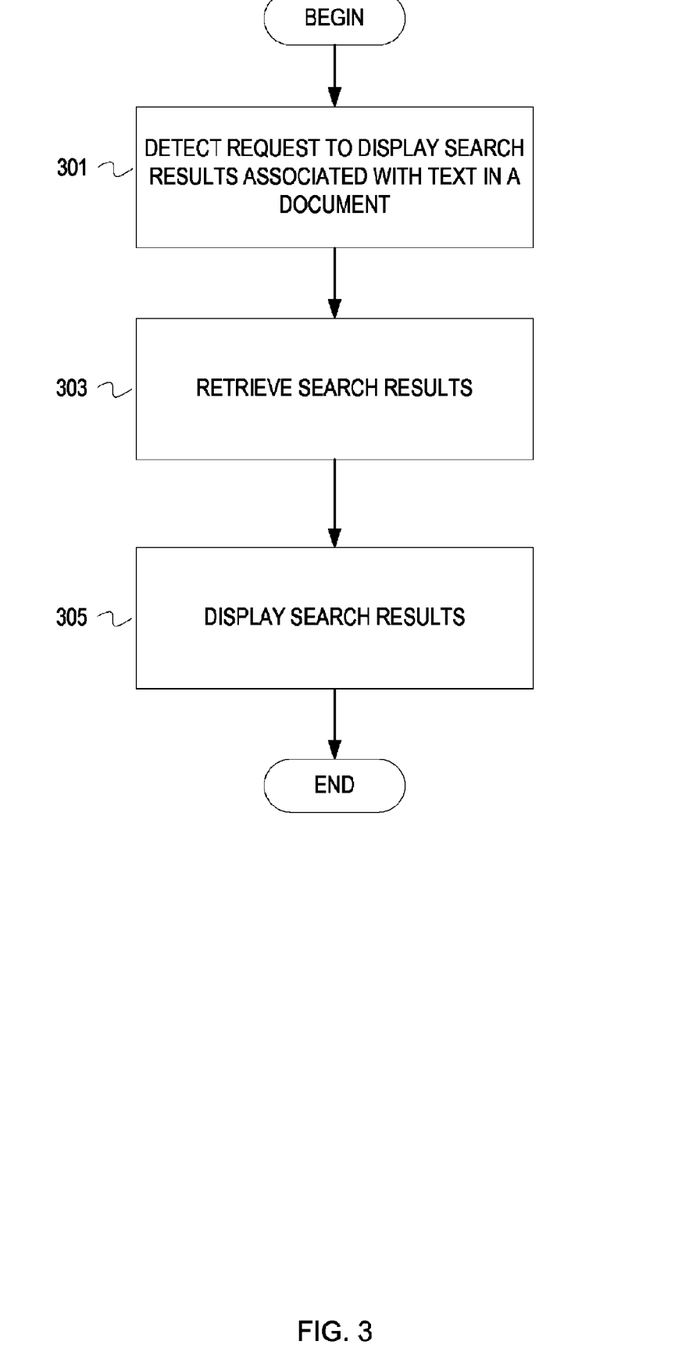
FIG. 3 is a flowchart depicting example operations for displaying search results associated with text in a document.

FIG. 3 is a flowchart depicting example operations for displaying search results associated with text in a document. Flow begins at block 301, where a request to display search results associated with text in a document is detected. For example, a user right clicks text that is associated with search results and chooses an option to view the search results from a drop down menu.

At block 303, the search results are retrieved. Search results may be retrieved by loading content referenced by a hyperlink, accessing cached references to the search results, etc.

At block 305, the search results are displayed. The search results may be displayed in a frame of the document editing application, in a browser, etc. When a user clicks on a specific resource in the search results, the resource may be opened in a tab of the document editing application, in a window of the document editing application, in a web browser, etc.

Figure 4:
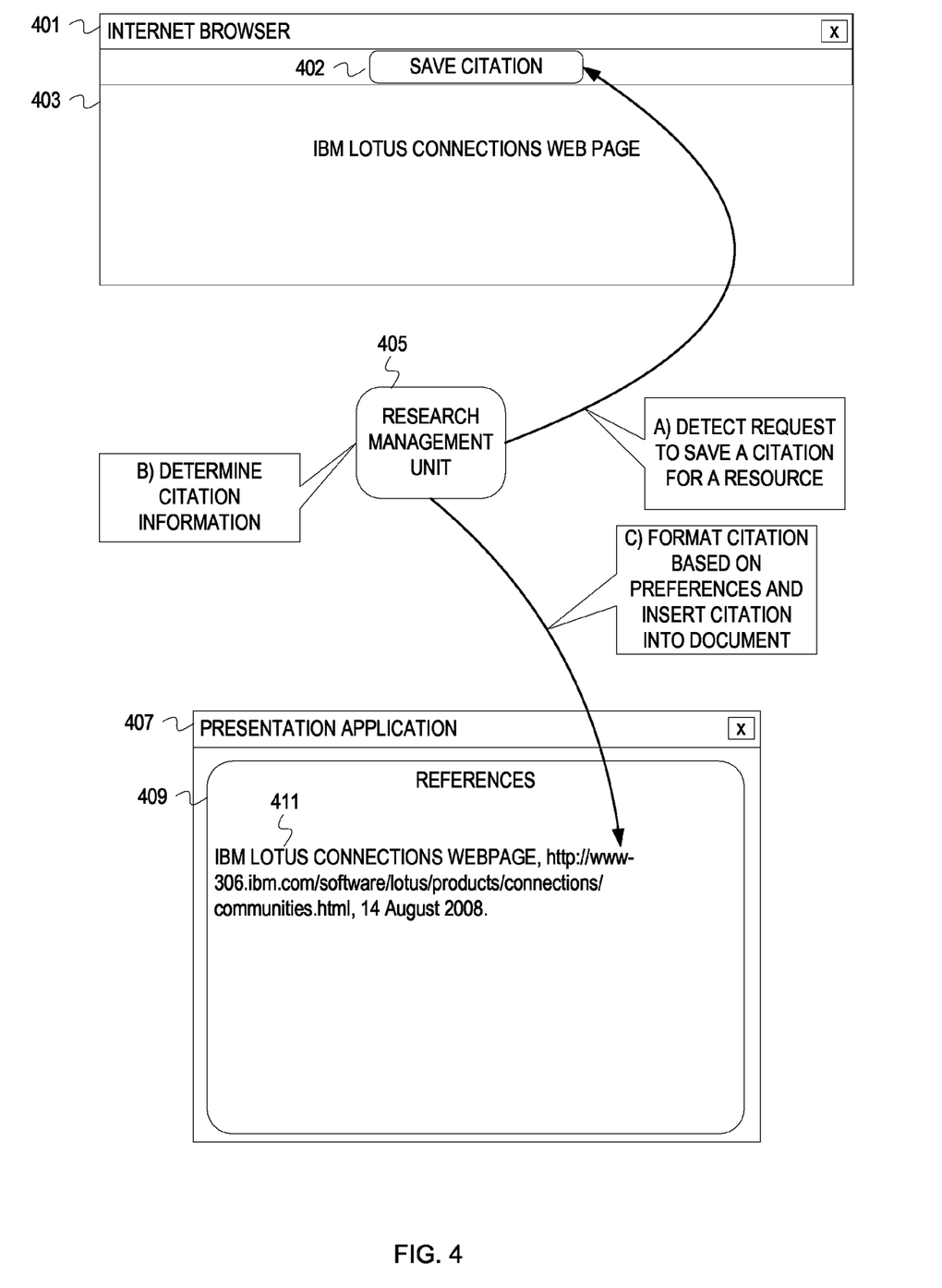
FIG. 4 depicts an example conceptual diagram of automatically formatting a citation of a resource.

The search results associated with text in a document allow a user to have instant access to information relevant to content of their document. The user may include content of a resource in the search results in the document and may wish to include a citation of the resource. FIG. 4 depicts an example conceptual diagram of automatically formatting a citation of a resource. A web page 403 is displayed in an Internet browser 401. A save citation button 402 exists in the toolbar of Internet browser 401. A document 409 comprising a slide is open in presentation application 407. The document 409 also comprises other slides not shown.

At stage A, a research management unit 405 detects a request to save a citation for the webpage 403. Examples of detecting a request to save a citation include detecting a click on a toolbar button, a click on an option in a drop down menu, a copy and paste between a resource and a document, etc.

At stage B, the research management unit 405 determines citation information for web page 403. Citation information comprises one or more of a URL, an author, a date, a title, etc. Citation information may be determined by examining resource metadata, tags, scanning resource text, etc.

At stage C, the research management unit 405 formats the determined citation information based on preferences, and inserts a corresponding citation 411 into the document 409. Preferences may indicate information that should be included in a citation, style (e.g., Modern Language Association (MLA) style, American Psychological Association style, etc.), location of the citation within the document, etc. In some embodiments, the citation may not be automatically inserted into a document. In this case, a formatted citation will be created and displayed in plain text. A user may copy and paste the formatted citation into a document.

Figure 5:
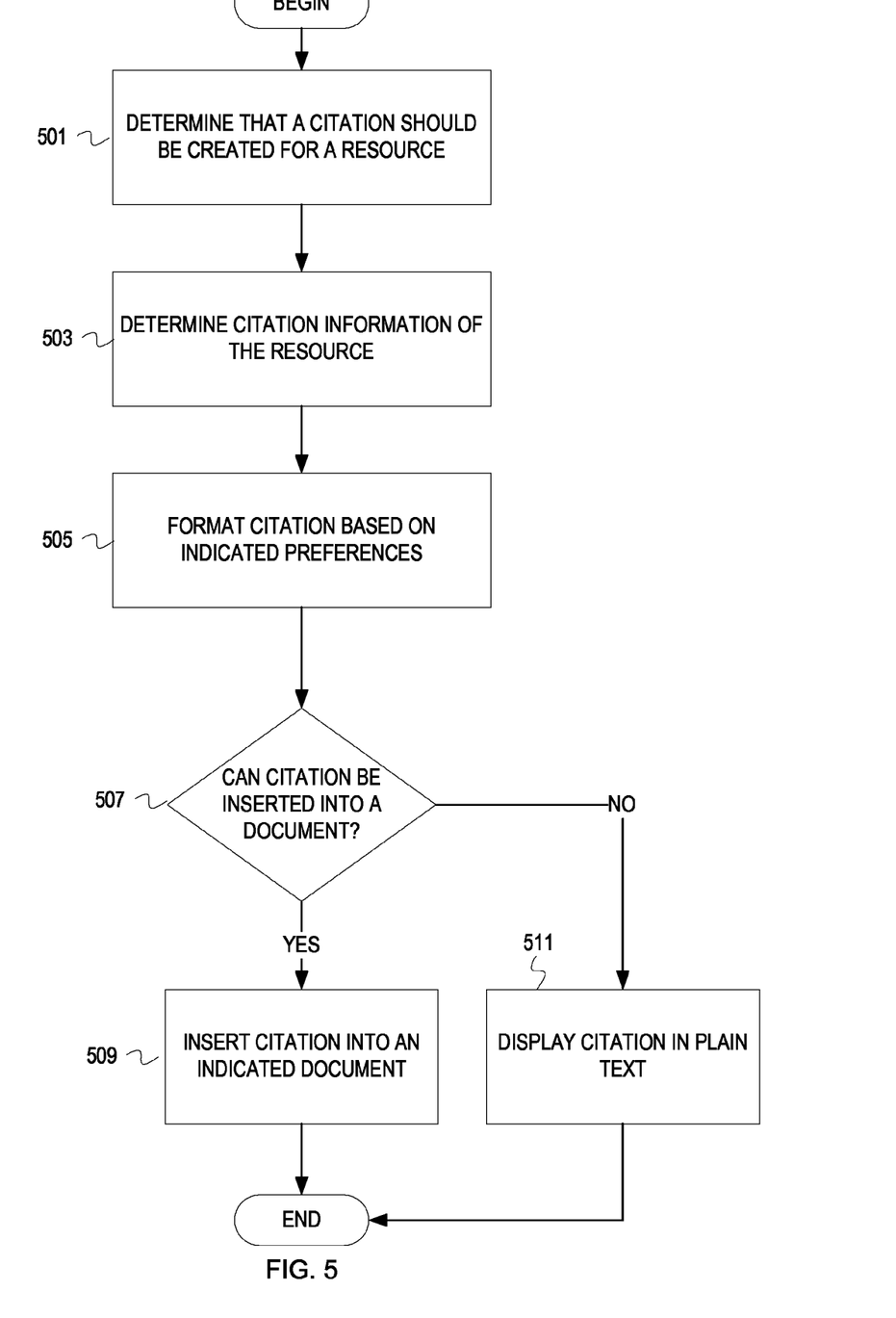
FIG. 5 is a flowchart depicting example operations for automatically creating a citation for a resource.

FIG. 5 is a flowchart depicting example operations for automatically creating a citation for a resource. Flow begins at block 501, where it is determined that a citation should be created for a resource. For example, a resource in the search results associated with text in a document is opened in a tab of a document editing application. A request to create a citation is detected when a user copies and pastes from the resource into the document.

At block 503, citation information of the resource is determined. For example, a title, author, and published date are found in the resource metadata.

At block 505, the citation is formatted based on indicated preferences. For example, preferences indicate that a URL, title and date retrieved should be included in a citation.

At block 507, it is determined if the citation can be inserted into a document. If the citation can be inserted into a document, flow continues at block 509. If the citation cannot be inserted into a document, flow continues at block 511.

At block 509, the citation is inserted into the document. The citation is inserted into a location (e.g., end notes, references page, footnotes, etc.) of the document based on indicated preferences.

At block 511, the citation is displayed in plain text. The user may copy and paste the citation into a document, email the citation, print the citation, etc.

It should be understood that the depicted flowchart are examples meant to aid in understanding embodiments and should not be used to limit embodiments or limit scope of the claims. Embodiments may perform additional operations, fewer operations, operations in a different order, operations in parallel, and some operations differently. For instance, referring to FIG. 2, searching a local machine, searching the Internet and searching special purpose search engines may occur in parallel. In addition, the operations for determining if one or more search results have been viewed previously and categorizing search results may occur in parallel.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 6:
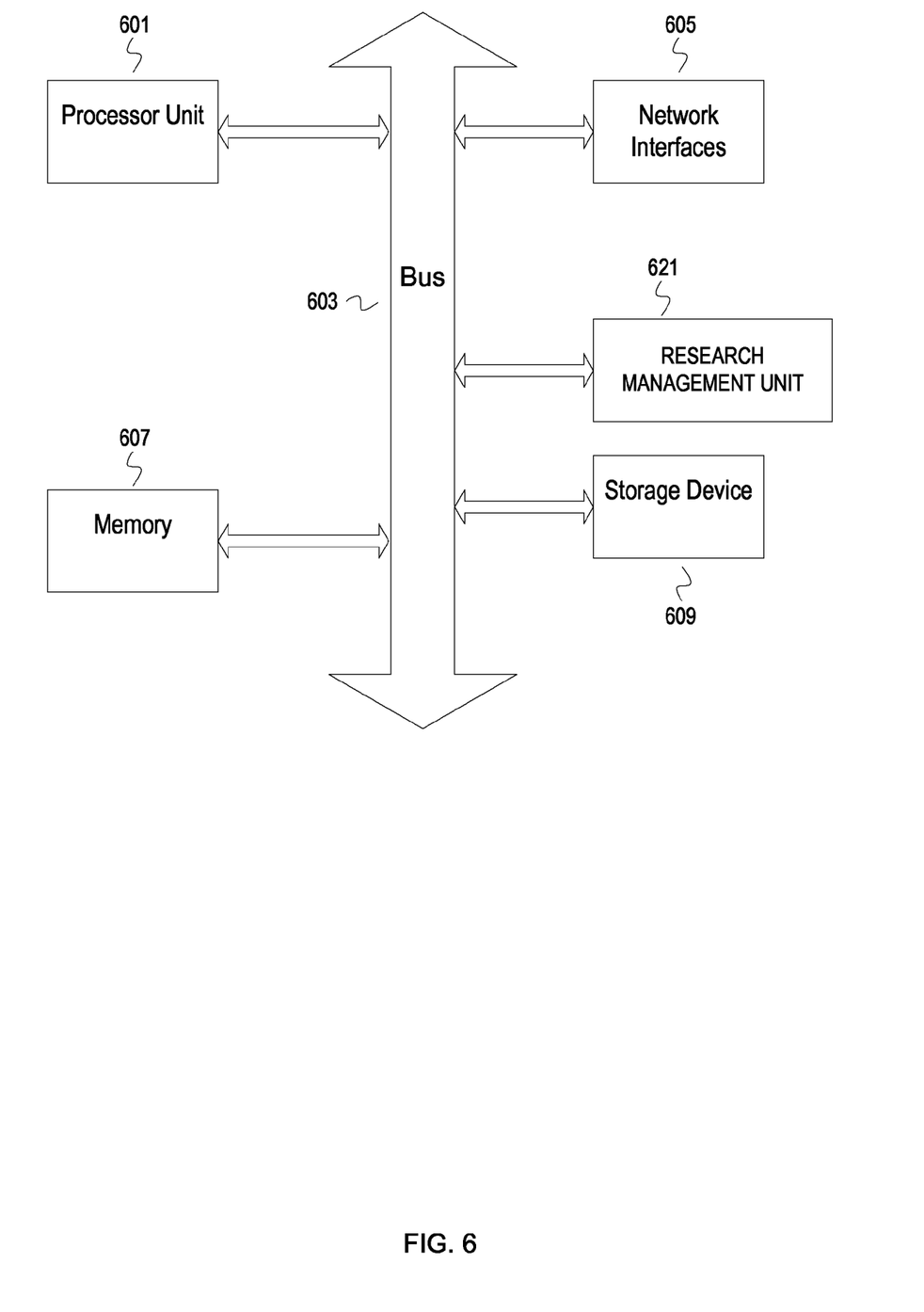
FIG. 6 depicts an example computer system.

FIG. 6 depicts an example computer system. A computer system includes a processor unit 601 (possibly including multiple processors, multiple cores, multiple nodes, and/or implementing multi-threading, etc.). The computer system includes memory 607. The memory 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 603 (e.g., PCI, ISA, PCI-Express, HyperTransport®, InfiniBand®, NuBus, etc.), a network interface 605 (e.g., an ATM interface, an Ethernet interface, a Frame Relay interface, SONET interface, wireless interface, etc.), and a storage device(s) 609 (e.g., optical storage, magnetic storage, etc.). The computer system also includes a research management unit 621 that determines keywords for a document, dynamically performs searches for the keywords and automatically associates search results with text in the document. The research management unit 621 also detects requests to save citation information for resources, formats a citation for the resource based on indicated preferences and inserts the citation into a document. Any one of these functionalities may be partially (or entirely) implemented in hardware and/or on the processing unit 601. For example, the functionality may be implemented with an application specific integrated circuit, in logic implemented in the processing unit 601, in a co-processor on a peripheral device or card, etc. Further, realizations may include fewer or additional components not illustrated in FIG. 6 (e.g., video cards, audio cards, additional network interfaces, peripheral devices, etc.). The processor unit 601, the storage device(s) 609, and the network interface 605 are coupled to the bus 603. Although illustrated as being coupled to the bus 603, the memory 607 may be coupled to the processor unit 601.

While the embodiments are described with reference to various implementations and exploitations, it will be understood that these embodiments are illustrative and that the scope of the inventive subject matter is not limited to them. In general, techniques for dynamically associating search content with keywords in a document as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   a document editing application determining a keyword based on a word or phrase in a document being edited in the document editing application;
   in response to determining the keyword, retrieving, by a processor, a plurality of search results, which were previously yielded from the keyword being submitted to a search engine independent of the document;
   refining the previously yielded plurality of search results based on context of the word or phrase within the document to yield one or more refined document context aware search results;
   categorizing the one or more refined document context aware search results based on prior consumption of the document to yield one or more categorized refined document context aware search results;
   associating the one or more categorized refined document context aware search results with the word or phrase in the document; and
   displaying the one or more categorized refined document context aware search results in a user interface of the document editing application along with the document when the word or phrase is selected in the document.

2. The method of claim 1, wherein said determining the keyword based on the word or phrase in the document further comprises at least one of determining the number of times the word or phrase appears in the document, and determining a synonym for the word or phrase.

3. The method of claim 1, wherein said retrieving the previously yielded plurality of search results comprises searching a cache of previously searched keywords for the keyword and determining the plurality of previously yielded search results as associated with the keyword in the cache.

4. The method of claim 3, wherein the cache of previously searched keywords and corresponding search results are captured by a browser plug-in.

5. The method of claim 1 further comprising determining those of the one or more refined document context aware search results that were viewed and those of the one or more refined document context aware search results that were not viewed, wherein said displaying the one or more refined document context aware search results in the user interface of the document editing application along with the document when the word or phrase is selected in the document comprises graphically distinguishing between the viewed and not viewed ones of the one or more refined document context aware search results.

6. The method of claim 1 further comprising:
   submitting the keyword to a second search engine to obtain a second plurality of search results, associating the second plurality of search results with the keyword;
   refining the second plurality of search results based on context of the word or phrase within the document to yield second refined document context aware search results; and
   displaying the second refined document context aware search results.

7. The method of claim 6 further comprising determining that a user preference of the document editing application indicates that the second search engine, which is a special purpose search engine, is to be searched.

8. The method of claim 1, wherein said refining the previously yielded plurality of search results comprises comparing words or phrases in the document with content of the previously yielded plurality of search results.

9. The method of claim 1 further comprising:
   determining that a citation should be created for a resource indicated by at least one of the one or more refined document context aware search results;
   formatting information about the resource in accordance with a format style to generate the citation, wherein a user preference of the document editing application indicate the formatting style; and
   inserting the citation into the document.

10. A method comprising:
    determining, by a processor, a plurality of keywords based on text in a document;
    dynamically performing searches on one or more sources with the plurality of keywords, wherein the dynamically performed searches yield search results;
    refining the search results based, at least in part, on content of the document; and
    categorizing the search results based on prior consumption of the document to yield one or more categorized refined document context aware search results;
    automatically associating the one or more categorized refined document context aware search results with corresponding ones of the keywords in the document.

11. The method of claim 10, wherein said refining the search results based, at least in part, on content of the document further comprises one or more of combining keywords and comparing words or phrases in the search results with words or phrases in the document.

12. One or more non-transitory machine-readable media having stored therein a program product for a document editing application, which when executed by a set of one or more processor units causes the set of one or more processor units to perform operations that comprise:
    determining a keyword based on a word or phrase in a document being edited in the document editing application,
    in response to determining the keyword, retrieving a plurality of search results, which were previously yielded from the keyword being submitted to a search engine independent of the document;
    refining the previously yielded plurality of search results based on context of the word or phrase within the document to yield one or more refined document context aware search results;
    categorizing the one or more refined document context aware search results based on prior consumption of the document to yield one or more categorized refined document context aware search results;

associating the one or more categorized refined document context aware search results with the word or phrase in the document; and displaying the one or more categorized refined document context aware search results in a user interface of the document editing application along with the document when the word or phrase is selected in the document.

13. The non-transitory machine-readable media of claim 12, wherein said operation of determining the keyword based on the word or phrase in the document comprises at least one of determining the number of times the word or phrase appears in the document, and determining a synonym for the word or phrase.

14. The non-transitory machine-readable media of claim 12, wherein said operation of retrieving the previously yielded plurality of search results comprises searching a cache of previously searched keywords for the keyword and determining the plurality of previously yielded search results as associated with the keyword in the cache.

15. The non-transitory machine-readable media of claim 14, wherein the cache of previously searched keywords and corresponding search results are captured by a browser plug-in.

16. The non-transitory machine-readable media of claim 12, wherein the operations further comprise determining those of the one or more refined document context aware search results that were viewed and those of the one or more refined document context aware search results that were not viewed, wherein said displaying the one or more refined document context aware search results in the user interface of the document editing application along with the document when the word or phrase is selected in the document comprises graphically distinguishing between the viewed and not viewed ones of the one or more refined document context aware search results.

17. The non-transitory machine-readable media of claim 12, wherein the operations further comprise:

submitting the keyword to a second search engine to obtain a second plurality of search results, associating the second plurality of search results with the keyword;

refining the second plurality of search results based on context of the word or phrase within the document to yield second refined document context aware search results; and displaying the second refined document context aware search results.

18. The non-transitory machine-readable media of claim 12, wherein the operations further comprise determining that a user preference of the document editing application indicates that the second search engine, which is a special purpose search engine, is to be searched.

19. The non-transitory machine-readable media of claim 12, wherein the operation of refining the previously yielded plurality of search results comprises comparing words or phrases in the document with content of the previously yielded plurality of search results.

20. The non-transitory machine-readable media of claim 12, wherein the operations further comprise:

determining that a citation should be created for a resource indicated by at least one of the one or more refined document context aware search results;

formatting information about the resource in accordance with a format style to generate the citation, wherein a user preference of the document editing application indicate the formatting style; and inserting the citation into the document.

21. An apparatus comprising:

a set of one or more processing units;

a network interface;

a research management unit operable to, determine a keyword based on a word or phrase in a document being edited in the document editing application, in response to determining the keyword, retrieving a plurality of search results, which were previously yielded from the keyword being submitted to a search engine independent of the document;

refining the previously yielded plurality of search results based on context of the word or phrase within the document to yield one or more refined document context aware search results;

categorize the one or more refined document context aware search results based on prior consumption of the document to yield one or more categorized refined document context aware search results;

associate the one or more categorized refined document context aware search results with the word or phrase in the document; and display the one or more refined categorized document context aware search results in a user interface of the document editing application along with the document when the word or phrase is selected in the document.

22. The apparatus of claim 21 further comprising a machine-readable storage media that embodies the research management unit.

* * * * *